US012609759B2

(12) United States Patent
Yan et al.

(10) Patent No.: US 12,609,759 B2
(45) Date of Patent: Apr. 21, 2026

(54) NARROWBAND INTERNET-OF-THINGS (NBIOT) PHYSICAL DOWNLINK CONTROL CHANNEL (PDCCH) MONITORING OPTIMIZATION IN NON-TERRESTRIAL NETWORKS (NTN)

(71) Applicant: Lenovo (Beijing) Ltd., Beijing (CN)

(72) Inventors: Zhi Yan, Xicheng District (CN); Hongmei Liu, Changping District (CN); Yuantao Zhang, Dongcheng District (CN); Yingying Li, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 416 days.

(21) Appl. No.: 17/914,680

(22) PCT Filed: Mar. 27, 2020

(86) PCT No.: PCT/CN2020/081670
§ 371 (c)(1),
(2) Date: Sep. 26, 2022

(87) PCT Pub. No.: WO2021/189422
PCT Pub. Date: Sep. 30, 2021

(65) Prior Publication Data
US 2023/0239038 A1    Jul. 27, 2023

(51) Int. Cl.
H04B 7/185        (2006.01)
H04W 52/02        (2009.01)
(Continued)

(52) U.S. Cl.
CPC .... *H04B 7/18513* (2013.01); *H04W 52/0216* (2013.01); *H04W 72/0446* (2013.01); *H04W 72/1263* (2013.01)

(58) Field of Classification Search
CPC .......... H04B 7/18513; H04W 52/0216; H04W 72/0446; H04W 72/1263; H04W 4/70;
(Continued)

(56) References Cited

U.S. PATENT DOCUMENTS 11,812,431 B2 * 11/2023 Sengupta .............. H04L 1/1819
2019/0313383 A1 * 10/2019 Xiong ................... H04W 16/14
(Continued)

FOREIGN PATENT DOCUMENTS

CN        110831027 A        2/2020
WO        2018174805 A1      9/2018

OTHER PUBLICATIONS

Spreadtrum R1-1906372 Discussion on cross-slot scheduling for UE power saving May 2019 (Year: 2019).*
(Continued)

*Primary Examiner* — Rina C Pancholi
(74) *Attorney, Agent, or Firm* — FIG. 1 Patents

(57) ABSTRACT

Methods and apparatuses for monitoring NPDCCH in NBIoT are disclosed. A method comprises receiving a first control signal scheduling a data transmission; and monitoring a second control signal from a start time slot to an end time slot, wherein the start time slot is a gap period behind the last time slot for receiving the first control signal, and the end time slot is a time period ahead of the first time slot for the data transmission.

12 Claims, 8 Drawing Sheets

(51) Int. Cl.
*H04W 72/0446* (2023.01)
*H04W 72/1263* (2023.01)

(58) Field of Classification Search
CPC ..... H04W 72/23; H04W 24/08; H04W 72/51; H04W 84/06; H04L 5/0044; H04L 5/0053; H04L 5/0078; H04L 5/0094; Y02D 30/70
See application file for complete search history.

(56) References Cited

U.S. PATENT DOCUMENTS

| | | | |
|---|---|---|---|
| 2022/0060252 A1* | 2/2022 | Qaise ................. | H04B 7/18504 |
| 2024/0205910 A1* | 6/2024 | Yan ................... | H04W 72/0446 |

OTHER PUBLICATIONS

Oppo R1-1910386 NTN control procedure for physical layer Oct. 2019 (Year: 2019).*
ZTE R1-1714803 Clarification on NPDCCH monitoring for Rel-14 2-HARQ process UE Aug. 2017 (Year: 2017).*
20926817.6 , "Extended European Search Report", EP Application No. 20926817.6, Nov. 20, 2023, 9 pages.
OPPO , "NTN control procedure for physical layer", 3GPP TSG RAN WG1 #98bis, R1-1910386, Chongqing, China [retrieved Oct. 26, 2022]. Retrieved from the Internet <https://www.3gpp.org/ftp/tsg_ran/WG1_RL1/TSGR1_98b/Docs>., Oct. 2019, 3 Pages.
Spreadtrum Communications , "Discussion on cross-slot scheduling for UE power saving", 3GPP TSG RAN WG1 Meeting #97, R1-1906372, Reno, USA [retrieved Dec. 31, 2023]. Retrieved from the Internet <https://www.3gpp.org/ftp/tsg_ran/WG1_RL1/TSGR1_97/Docs>, May 2019, 7 pages.
Ericsson , "FL summary#0 for physical layer control procedures for NTN", 3GPP TSG-RAN WG1 Meeting #98, R1-1909485, Prague, Czech Republic [retrieved Sep. 19, 2022]. Retrieved from the Internet <https://www.3gpp.org/ftp/tsg_ran/WG1_RL1/TSGR1_98/Docs?sortby=namerev>., Aug. 2019, 8 Pages.
Nokia , "Supporting 2 HARQ processes for NB-Iot", 3GPP TSG-RAN WG1 Meeting #86bis, R1-1608888, Lisbon, Portugal [retrieved Sep. 19, 2022]. Retrieved from the Internet <https://www.3gpp.org/ftp/tsg_ran/wg1_rL1/TSGR1_86b/Docs/>., Oct. 2016, 3 Pages.
PCT/CN2020/081670 , "International Preliminary Report on Patentability", PCT Application No. PCT/CN2020/081670, Oct. 6, 2022, 5 pages.
PCT/CN2020/081670 , "International Search Report and Written Opinion", PCT Application No. PCT/CN2020/081670, Dec. 31, 2020, 6 pages.
PCT/CN2020/132709 , "International Preliminary Report on Patentability", PCT Application No. PCT/CN2020/132709, Oct. 6, 2022, 5 pages.
PCT/CN2020/132709 , "International Search Report and Written Opinion", PCT Application No. PCT/CN2020/132709, Feb. 9, 2021, 6 pages.
RAN2 , "Reply LS on monitoring of partial NPDCCH search spaces", 3GPP TSG RAN WG1 Meeting #90, R1-1712038, Prague, Czech Republic [retrieved Aug. 19, 2022]. Retrieved from the Internet <https://www.3gpp.org/ftp/tsg_ran/WG1_RL1/TSGR1_90/LS/Incoming/>., May 2017, 1 Page.
ZTE , et al., "Clarification on NPDCCH monitoring for Rel-14 2-HARQ process UE", 3GPP TSG RAN WG1 Meeting #90, R1-1714803, Prague, Czechia [retrieved Sep. 19, 2022]. Retrieved from the internet <https://www.3gpp.org/ftp/TSG_RAN/WG1_RL1/TSGR1_90/Docs/?sortby=namerev>., Aug. 2017, 3 Pages.
202080097845.0 , "Foreign Office Action", US Application No. 202080097845.0, Jul. 16, 2024, 13 pages.
Ericsson , "DRX enhancements for NTN", 3GPP TSG-RAN WG2 #107, Tdoc R2-1911395, Prague, Czech Republic, Aug. 2019, 6 pages.
Mediatek Inc. , "Physical layer control procedure in NR-NTN", 3GPP TSG RAN WG1 Meeting #98, R1-1908014, Prague, Czech Republic, Aug. 2019, 5 pages.
"Foreign Office Action", Korean Application No. 10-2022-7033641, Jun. 23, 2025, 13 pages.
"Foreign Office Action", EP Application No. 20926817.6, Jul. 30, 2025, 9 pages.
Asia Pacific Telecom, "Discussion on physical layer control procedures for NTN", 3GPP TSG-RAN WG1 Meeting #98-Bis, R1-1910845, Oct. 14, 2019, 3 pages.
NTT Docomo, Inc., "Clarification of PDCCH monitoring when not fully aligned with PDCCH periods", 3GPP TSG-RAN2 Meeting #108, R2-1914482, Nov. 18, 2019, 6 pages.

* cited by examiner

NBIoT legacy

NBIoT in NTN

NBIoT legacy

UE monitor NPDCCH in the whole delay period

NARROWBAND INTERNET-OF-THINGS (NBIOT) PHYSICAL DOWNLINK CONTROL CHANNEL (PDCCH) MONITORING OPTIMIZATION IN NON-TERRESTRIAL NETWORKS (NTN)

FIELD

The subject matter disclosed herein generally relates to wireless communications, and more particularly relates to methods and apparatuses for NBIoT NPDCCH monitoring optimization in non-terrestrial network (NTN).

BACKGROUND

The following abbreviations are herewith defined, at least some of which are referred to within the following description: Third Generation Partnership Project (3GPP), New Radio (NR), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Physical Downlink Control Channel (PDCCH), Downlink control information (DCI), single DCI (S-DCI), transmission reception point (TRP), multiple TRP (multi-TRP or M-TRP), frequency range 2 (FR2), Quasi Co-Location (QCL), channel state information reference signal (CSI-RS), CSI-RS Resource Indicator (CRI), Code Division Multiplexing (CDM), Transmission Configuration Indication (TCI), Sounding Reference Signal (SRS), Control Resource Set (CORESET), Synchronization Signal (SS), reference signal (RS), non-terrestrial networks (NTN), terrestrial network (TN), Transport Block (TB), Internet-of-Things (IoT), Narrowband Internet-of-Things (NB-IoT or NBIoT), NBIoT PUSCH (NPUSCH), NBIoT PDCSH (NPDSCH), NBIoT PDCCH (NPDCCH), Machine-Type Communication (MTC), MTC PDCCH (MPDCCH), receiver and transmitter distance (RTD), Hybrid Automatic Repeat reQuest (HARQ), Geostationary Earth Orbit (GEO), Low Earth orbit (LEO).

For NBIoT, DCI Format N0 (referred to as DCI N0 hereinafter) is used to trigger a NPUSCH format 1 uplink transmission. When an NBIoT UE receives a DCI N0 on NPDCCH at time slot n (hereinafter, time slot is referred to as subframe), it schedules the NPUSCH format 1 uplink transmission at subframe n+k. When the maximum HARQ process number is equal to 2, the NBIoT UE has to monitor a second DCI N0 after receiving a first DCI N0.

As shown in FIG. 1, if the NBIoT UE detects NPDCCH with DCI N0 (e.g. a first DCI N0) ending in subframe n, and if the corresponding NPUSCH format 1 transmission starts from n+k, the UE is required to monitor an NPDCCH candidate (for a second DCI N0) in subframes starting from subframe n+1 to subframe n+k−3 for a second DCI N0, and is not required to monitor an NPDCCH candidate in subframes starting from subframe n+k−2 to subframe n+k−1.

As the maximal HARQ process number is 2, UE continues to monitor the NPDCCH from subframe n+1 to subframe n+k−3 for a next DCI N0 (i.e. a second DCI N0). However, as there should be 2 subframes (subframe n+k−2 and subframe n+k−1) used for switching before the NPUSCH transmission, UE will not monitor NPDCCH at these 2 subframes (subframe n+k−2 and subframe n+k−1).

The long receiver and transmitter distance (RTD) in NTN has an impact on timing relationship of NR (New Radio). An offset $K_{offset}$ can be introduced to modify relevant timing relationships. For example, for the transmission timing of DCI scheduled PUSCH (including CSI on PUSCH), the slot allocated for the PUSCH can be modified to be $$\left\lfloor n \cdot \frac{2^{\mu_{PUSCH}}}{2^{\mu_{PDCCH}}} \right\rfloor + K_2 + K_{offset}.$$

For the transmission timing of RAR grant scheduled PUSCH, the UE transmits the PUSCH in slot $n+K_2+\Delta\alpha K_{offset}$ for the corresponding DCI in slot n. $K_2$ is the scheduling delay indicated in DCI and $\mu_{PUSCH}$ and $\mu_{PDCCH}$ are the parameters corresponding to the subcarrier space related to the PUSCH and PDCCH. For example, for subcarrier space of PUSCH is 15 KHz, $\mu_{PUSCH}$ is equal to 1, while for subcarrier space of PDCCH is 30 KHz, $\mu_{PDCCH}$ is equal to 2.

For NBIoT in NTN, it is straightforward to introduce the timing offset $K_{offset}$ and apply it to modify the timing relationships (similar to NR NTN).

For example, as shown in FIG. 2, for the transmission timing of DCI scheduled NPUSCH in NBIoT legacy, the UE transmits the NPUSCH from subframe $n+k_0$ (i.e. $k=k_0$).

As shown in FIG. 2, the scheduling delay $(k_0)$ between the DCI (i.e. DCI N0) and the corresponding NPUSCH (i.e. NPUSCH format 1) is indicated by DCI N0. In particular, the scheduling delay $(k_0)$ depends on the scheduling delay index $(I_{Delay})$ and the preconfigured maximal transmission repetitions of control signal $(R_{max})$, i.e. maximum number of repetitions of NPDCCH carrying the DCI N0, as shown in below Table 1. The scheduling delay index $(I_{Delay})$ is contained in the DCI N0. The maximal transmission repetitions of control signal $(R_{max})$ is preconfigured by higher layer.

TABLE 1

| | $k_0$ | |
|---|---|---|
| $I_{Delay}$ | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

On the other hand, as shown in FIG. 3, for the transmission timing of DCI scheduled NPUSCH in NBIoT in NTN, the UE may transmit the NPUSCH from subframe $n+k_0+K_{offset}$ (i.e. $k=k_0+K_{offset}$). $k_0$ is determined (or indicated) by DCI N0. $K_{offset}$ is related to the round trip distance from the UE and eNB. $K_{offset}$ can be configured in SIB or RRC signaling. If the UE has its location information and the earth orbit and ephemeris information, the UE can calculate the round trip delay from the eNB and UE by itself. The earth orbit and ephemeris information indicates the position where the satellite is. In other words, the $K_{offset}$ can be alternatively determined by the UE itself. The value of the $K_{offset}$ may be determined by types of satellites. For example, if the eNB is on LEO, $K_{offset}$ can be tens of milliseconds, while if the eNB is on GEO, $K_{offset}$ can be hundreds of milliseconds.

In the condition that the maximal HARQ process number for uplink transmission (NPUSCH format 1 transmission) is configured to 2 in NBIoT, when the scheduling delay between the DCI and the corresponding NPUSCH is extended to $k_0+K_{offset}$, the UE would continue to monitor the NPDCCH for a next DCI in the following UE specific search space, i.e. the delay period except for the last two subframes before the NPUSCH transmission that are used for switching. However, due to long RTD in NTN, the delay $k_0+K_{offset}$ would be quite long. Therefore, unnecessary power consumption may be present in monitoring the next DCI in the UE specific search space.

This disclosure targets for saving power for the UE specific search space on NBIoT in NTN.

BRIEF SUMMARY

Methods and apparatuses for monitoring NPDCCH in NBIoT are disclosed.

In one embodiment, a method comprises receiving a first control signal scheduling a data transmission; and monitoring a second control signal from a start time slot to an end time slot, wherein the start time slot is a gap period behind the last time slot for receiving the first control signal, and the end time slot is a time period ahead of the first time slot for the data transmission.

In one embodiment, the gap period is configured by broadcast signal. Alternatively, the gap period is determined by at least one of UE location information, and corresponding satellite orbit and ephemeris information.

In another embodiment, the method further comprises skipping monitoring the second control signal during the gap period, wherein the first time slot of the gap period is next to the last time slot for receiving the first control signal.

In some embodiment, the time period between the end time slot and the first time slot for the data transmission is two time slots.

In another embodiment, a remote unit comprises a receiver configured to receive a first control signal scheduling a data transmission; and a processor configured to monitor a second control signal from a start time slot to an end time slot, wherein the start time slot is a gap period behind the last time slot for receiving the first control signal, and the end time slot is a time period ahead of the first time slot for the data transmission.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
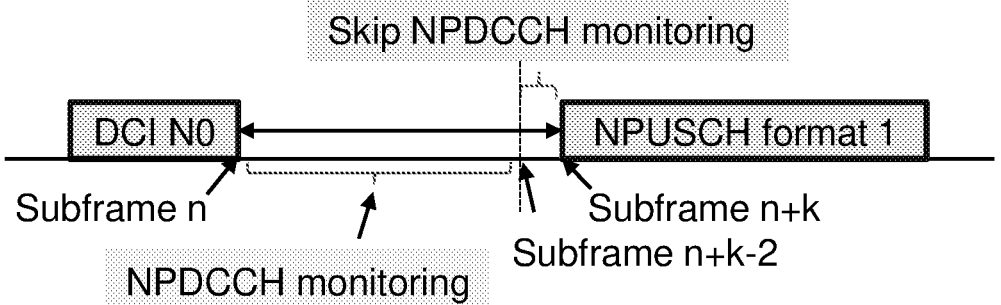
FIG. 1 illustrates a legacy NPDCCH search space.
Figure 2:
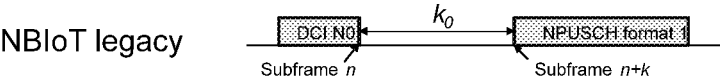
FIG. 2 illustrates the legacy NPDCCH search space.
Figure 3:
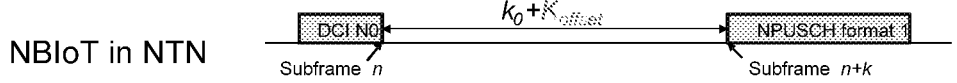
FIG. 3 illustrates an updated legacy NPDCCH search space.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, to and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Figure 4:
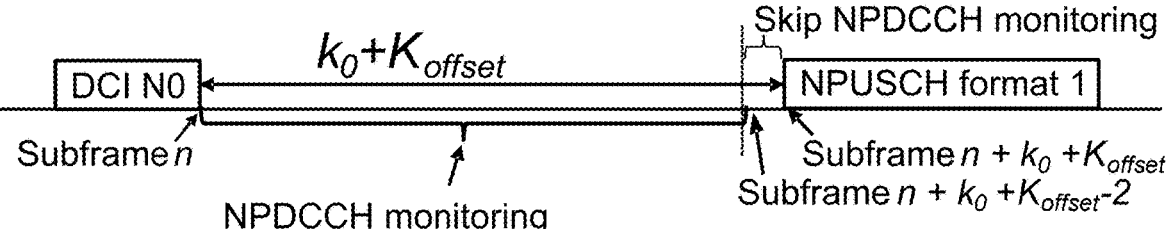
FIG. 4 illustrates the monitoring of NPDCCH in the updated legacy NPDCCH search space.

As described in the background part, unnecessary power consumption may be present in monitoring the next DCI in the UE specific search space. FIG. 4 illustrates the monitoring of NPDCCH when the delay period is extended to $k_0+K_{offset}$.

As shown in FIG. 4, the UE, after receiving a first DCI N0 ending in time slot n (hereinafter, time slot is referred to as subframe), will start the corresponding NPUSCH format 1 transmission starting from subframe $n+k_0+K_{offset}$ (i.e. $k=k_0+K_{offset}$). In addition, the UE continues to monitor the NPDCCH from subframe n+1 to subframe $n+k_0+K_{offset}-3$ for a next DCI N0 (a second DCI N0). The UE does not monitor the NPDCCH at subframe $n+k_0+K_{offset}-2$ and subframe $n+k_0+K_{offset}-1$ as these two frames are used for switching to the NPUSCH transmission. $k_0$ is determined by DCI N0. $K_{offset}$ is configured by broadcast signal, e.g. in SIB or RRC signaling. $K_{offset}$ may be alternatively determined by the UE when the UE has its position information, and the earth orbit and ephemeris information. The earth orbit and ephemeris information indicates the position where the satellite is.

Due to long RTD in NTN, the offset $K_{offset}$ may be quite long. Therefore, it is power wasting to monitor the NPDCCH for the second DCI N0 during the entire period from subframe n+1 to subframe $n+k_0+K_{offset}-3$.

Figure 5:
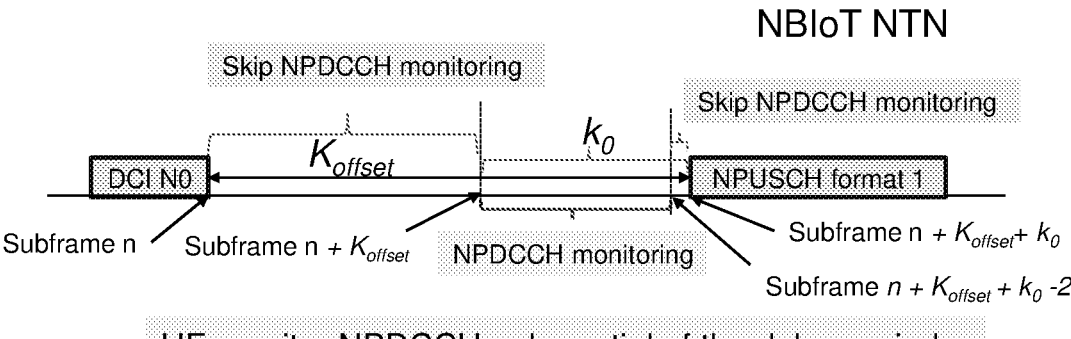
FIG. 5 illustrates the monitoring of NPDCCH according to an embodiment.

FIG. 5 illustrates the monitoring of NPDCCH according to an embodiment of the present application.

As shown in FIG. 5, the UE receives a first DCI N0 ending in subframe n. Then, the UE skips NPDCCH monitoring from subframe n+1 to subframe $n+K_{offset}$. The UE monitors NPDCCH for a second DCI N0 from subframe $n+K_{offset}+1$ to subframe $n+K_{offset}+k_0-3$. The UE is not required to monitor NPDCCH for the last two subframes, i.e. subframe $n+K_{offset}+k_0-2$ and subframe $n+K_{offset}+k_0-1$, used for switching to the NPUSCH transmission. The UE starts NPUSCH format 1 transmission indicated by the first DCI N0 from subframe $n+K_{offset}+k_0$.

It can be seen that, according to the present invention, if the NB-IoT UE detects NPDCCH with DCI Format N0 ending in subframe n, and if the corresponding NPUSCH format 1 transmission starts from n+k (i.e. $n+K_{offset}+k_0$), the UE is not required to monitor an NPDCCH candidate during a gap period, i.e. in subframes starting from subframe n+1 to subframe $n+K_{offset}$ nor during a time period (used for switching), i.e. from subframe $n+K_{offset}+k_0-2$ to subframe $n+K_{offset}+k_0-1$. The first subframe of the gap period, i.e. subframe n+1, is just behind (i.e. next to) the last subframe for receiving DCI Format N0, i.e. subframe n.

From another point of view, if the NB-IoT UE detects NPDCCH with DCI Format N0 ending in subframe n, and if the corresponding NPUSCH format 1 transmission starts from subframe n+k (i.e. $n+K_{offset}+k_0$), the UE monitors an NPDCCH candidate from a start subframe $n+K_{offset}+1$ to an end subframe $n+K_{offset}+k_0-3$.

The start subframe, i.e. subframe $n+K_{offset}+1$, is behind the last subframe for receiving DCI Format N0, i.e. subframe n, by the gap period (from subframe n+1 to subframe $n+K_{offset}$). In other words, the gap period (from subframe n+1 to subframe $n+K_{offset}$) is between the last subframe for receiving DCI Format N0, i.e. subframe n, and the start subframe, i.e. subframe $n+K_{offset}+1$.

The end subframe, i.e. subframe $n+K_{offset}+k_0-3$, is two subframes ahead of the first subframe for NPUSCH format 1 transmission (i.e. subframe $n+K_{offset}+k_0$). In other words, the two subframes used for switching (subframe $n+K_{offset}+k_0-2$ and subframe $n+K_{offset}+k_0-1$) are between the end subframe (subframe $n+K_{offset}+k_0-3$) and the first subframe for NPUSCH format 1 transmission (subframe $n+K_{offset}+k_0$).

According to the present invention, for NBIoT in NTN with maximum HARQ process number of 2, after reception a first DCI N0, UE will start to monitor the NPDCCH for a second DCI N0 after the gap period, e.g., after $K_{offset}$ subframes.

The gap period may be configured by broadcast signal, e.g. by SIB or higher layer. The gap period ranges from tens of milliseconds to hundreds of milliseconds. For example, if the eNB is on LEO, the gap period may be tens of milliseconds, while if the eNB is on GEO, the gap period may be hundreds of milliseconds. The gap period may be alternatively determined by the UE if the UE has its location information, and the earth orbit and ephemeris information.

A NPDCCH search space is periodic. The length of the NPDCCH search space (i.e. NPDCCH period) may be indicated as $T=G\cdot R_{max}$, in which G is determined by higher layer, $R_{max}$ is the maximum number of NPDCCH repetition. The gap period may be represented in unit of NPDCCH period. For example, the gap period may be 10 NPDCCH periods (i.e. $10T=10G\cdot R_{max}$).

A comparison between FIG. 4 and FIG. 5 can indicate that the UE does not monitor NPDCCH for a next DCI N0 from subframe n+1 to subframe $n+K_{offset}$ according to the embodiment of the present invention (FIG. 5) while the UE has to monitor NPDCCH from subframe n+1 to subframe $n+K_{offset}$ according to prior art shown in FIG. 4. Therefore, power consumption for monitoring from subframe n+1 to subframe $n+K_{offset}$ can be saved according to the embodiment of the present invention.

The NPDCCH monitoring window according to the present invention, i.e. from subframe $n+K_{offset}+1$ to subframe $n+K_{offset}+k_0-3$ as shown in FIG. 5, is positioned at the end of the gap period between the last subframe for receiving DCI N0 and the corresponding NPUSCH transmission (in particular, 2 subframes (used for switching) ahead of the NPUSCH transmission), rather than in the beginning or middle of the gap period. The position of the NPDCCH monitoring window is chosen in view of facilitating the scheduling, especially when the maximum HARQ process number is equal to 2.

Figure 6:
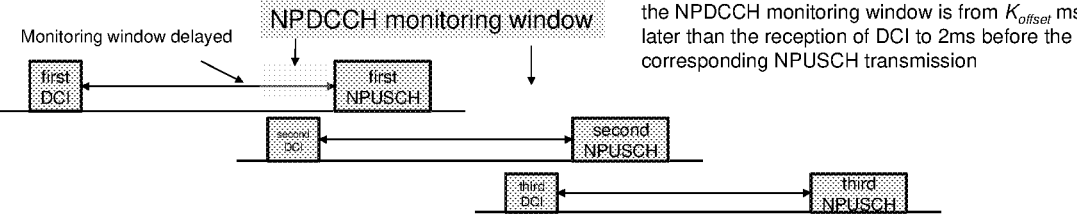
FIG. 6 illustrates a situation in which the NPDCCH monitoring window is positioned at the end of the gap period.
Figure 7:
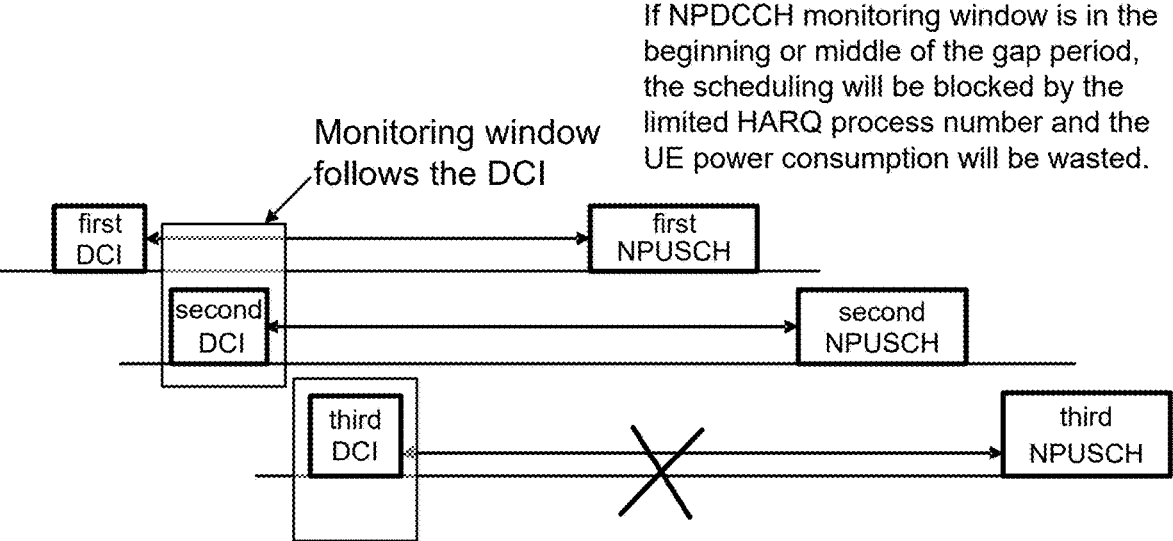
FIG. 7 illustrates a situation in which the NPDCCH monitoring window is positioned in the beginning of the gap period.

FIG. 6 illustrates a situation in which the NPDCCH monitoring window is positioned at the end of the gap period. FIG. 7 illustrates another situation in which the NPDCCH monitoring window is positioned in the beginning of the gap period (e.g. following the DCI).

As shown in FIG. 6, the second DCI is monitored at the end of the gap period between the first DCI and the corresponding first NPUSCH; the third DCI is monitored at the end of the gap period between the second DCI and the corresponding second NPUSCH. The scheduling is made smoothly.

On the other hand, as shown in FIG. 7, the scheduling will be blocked by the limited (two) HARQ process numbers.

As a whole, if the NB-IoT UE detects NPDCCH with DCI Format N0 ending in subframe n, and if the corresponding NPUSCH format 1 transmission starts from subframe n+k, the UE is not required to monitor an NPDCCH candidate in subframes starting from subframe n+1 to subframe n+$K_{offset}$ and from subframe n+k−2 to subframe n+k−1 (assuming k=$K_{offset}$+$k_0$).

Figure 8:
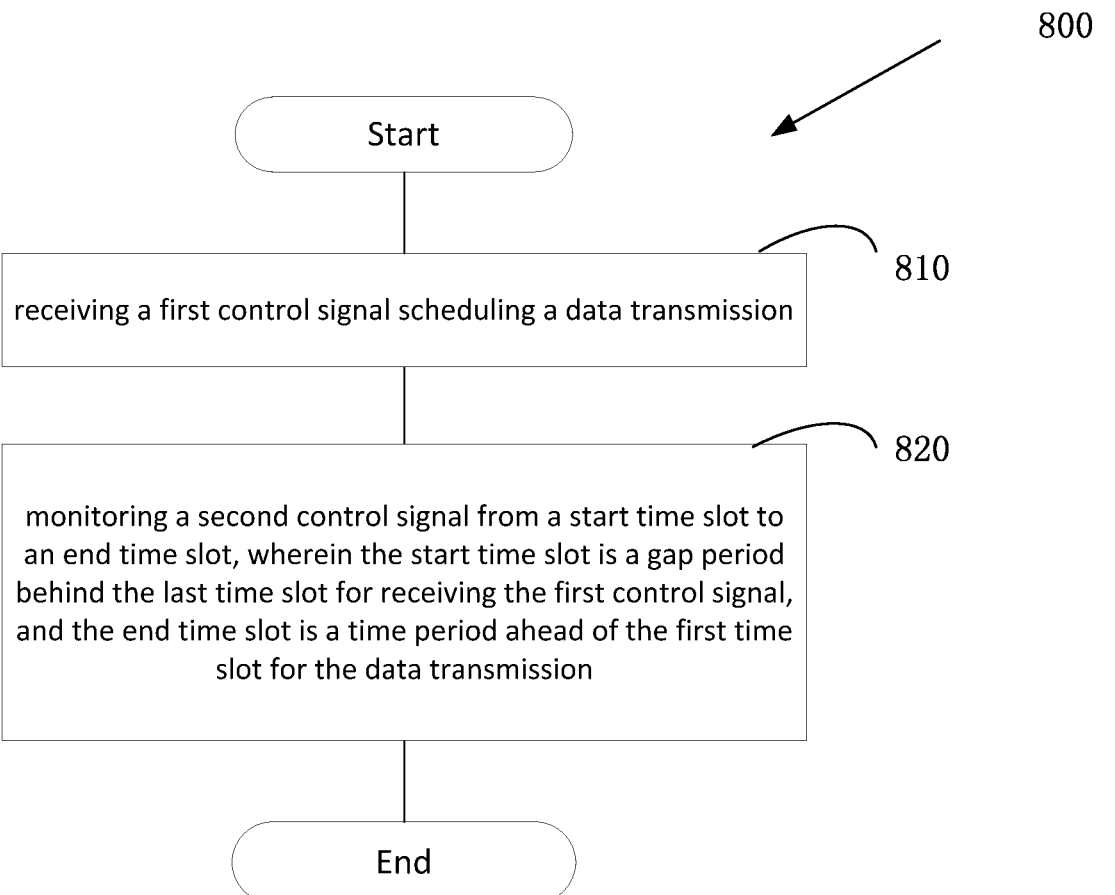
FIG. 8 is a schematic flow chart diagram illustrating an embodiment of a method.

FIG. 8 is a schematic flow chart diagram illustrating an embodiment of a method 800 according to the present application. In some embodiments, the method 800 is performed by an apparatus, such as a remote unit. In certain embodiments, the method 800 may be performed by a processor executing program code, for example, a microcontroller, a microprocessor, a CPU, a GPU, an auxiliary processing unit, a FPGA, or the like.

The method 800 may include 810 receiving a first control signal scheduling a data transmission; and 820 monitoring a second control signal from a start time slot to an end time slot, wherein the start time slot is a gap period behind the last time slot for receiving the first control signal, and the end time slot is a time period ahead of the first time slot for the data transmission.

Figure 9:
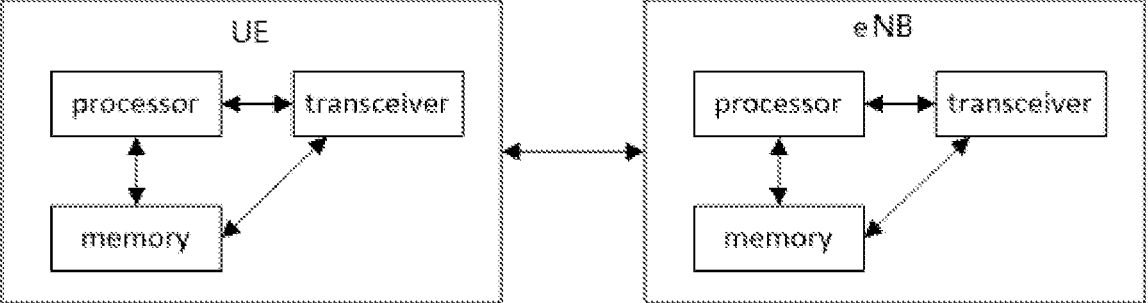
FIG. 9 is a schematic block diagram illustrating apparatuses according to one embodiment.

FIG. 9 is a schematic block diagram illustrating apparatuses according to one embodiment.

Referring to FIG. 9, the UE (i.e. the remote unit) includes a processor, a memory, and a transceiver. The processor implements a function, a process, and/or a method which are proposed in FIG. 8. The eNB (i.e. base unit) includes a processor, a memory, and a transceiver. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a first control signal scheduling a data transmission, wherein the first control signal ends at a last time slot; and
   monitoring a second control signal from an end of a start time slot to a beginning of an end time slot, wherein the start time slot is a gap period behind the last time slot for receiving the first control signal and before the second control signal, the end time slot is a time period ahead of a first time slot for the data transmission and after the second control signal, a time period between the beginning of the end time slot and an end of the first time slot for the data transmission comprises two time slots, and the gap period is longer than the end time slot.

2. The method of claim 1, wherein, the gap period is configured by broadcast signal.

3. The method of claim 1, wherein the gap period is determined by at least one of user equipment (UE) location information, or corresponding satellite orbit and ephemeris information.

4. The method of claim 1, further comprising: skipping monitoring the second control signal during the gap period, wherein a first time slot of the gap period is next to the last time slot for receiving the first control signal.

5. A remote unit, comprising:
   at least one memory; and
   at least one processor coupled with the at least one memory and operable to:
      receive a first control signal scheduling a data transmission, wherein the first control signal ends at a last time slot; and
      monitor a second control signal from an end of a start time slot to a beginning of an end time slot, wherein the start time slot is a gap period behind the last time slot for receiving the first control signal and before the second control signal, the end time slot is a time period ahead of a first time slot for the data transmission and after the second control signal, a time period between the beginning of the end time slot and an end of the first time slot for the data transmission comprises two time slots, and the gap period is longer than the end time slot.

6. The remote unit of claim 5, wherein, the gap period is configured by broadcast signal.

7. The remote unit of claim 5, wherein the gap period is determined by at least one of user equipment (UE) location information, or corresponding satellite orbit and ephemeris information.

8. The remote unit of claim 5, wherein, the at least one processor is further operable to skip monitoring the second control signal during the gap period, wherein a first time slot of the gap period is next to the last time slot for receiving the first control signal.

9. A processor for wireless communication, comprising:
   at least one controller coupled with at least one memory and operable to:
      receive a first control signal scheduling a data transmission, wherein the first control signal ends at a last time slot; and
      monitor a second control signal from an end of a start time slot to a beginning of an end time slot, wherein the start time slot is a gap period behind the last time slot for receiving the first control signal and before the second control signal, the end time slot is a time period ahead of a first time slot for the data transmission and after the second control signal, a time period between the beginning of the end time slot and an end of the first time slot for the data transmission comprises two time slots, and the gap period is longer than the end time slot.

10. The processor of claim 9, wherein, the gap period is configured by broadcast signal.

11. The processor of claim 9, wherein the gap period is determined by at least one of user equipment (UE) location information, or corresponding satellite orbit and ephemeris information.

12. The processor of claim 9, wherein the processor is further operable to skip monitoring the second control signal during the gap period, wherein a first time slot of the gap period is next to the last time slot for receiving the first control signal.

* * * * *